(12) United States Patent
Wilder et al.

(10) Patent No.: US 10,046,981 B2
(45) Date of Patent: Aug. 14, 2018

(54) WATER FILTER AND ASSEMBLY THEREOF

(71) Applicant: STRAUSS WATER LTD., Petach Tikva (IL)

(72) Inventors: Haim Wilder, Raanana (IL); Eyal Krystal, Kfar Saba (IL); Stanislav Ratner, Zur Hadassa (IL); Hella Frenkel, Kfar Saba (IL)

(73) Assignee: STRAUSS WATER LTD., Petach Tikva (IL)

( * ) Notice: Subject to any disclaimer, the term of this patent is extended or adjusted under 35 U.S.C. 154(b) by 0 days.

(21) Appl. No.: 15/556,023

(22) PCT Filed: Jan. 18, 2016

(86) PCT No.: PCT/IL2016/050056
§ 371 (c)(1),
(2) Date: Sep. 6, 2017

(87) PCT Pub. No.: WO2016/151568
PCT Pub. Date: Sep. 29, 2016

(65) Prior Publication Data
US 2018/0065863 A1 Mar. 8, 2018

Related U.S. Application Data

(60) Provisional application No. 62/136,651, filed on Mar. 23, 2015.

(51) Int. Cl.
*C02F 1/28* (2006.01)
*C02F 1/42* (2006.01)
(Continued)

(52) U.S. Cl.
CPC .............. *C02F 1/003* (2013.01); *B01D 24/18* (2013.01); *B01D 29/58* (2013.01); *C02F 1/283* (2013.01);
(Continued)

(58) Field of Classification Search
CPC .. C02F 1/003; C02F 1/283; C02F 1/42; C02F 1/50; C02F 9/005; C02F 2101/103;
(Continued)

(56) References Cited

U.S. PATENT DOCUMENTS

| 789,968 A | 5/1905 | Ernst |
| 1,090,283 A | 3/1914 | Merton et al. |

(Continued)

FOREIGN PATENT DOCUMENTS

| DE | 3828008 A1 | 3/1990 |
| DE | 202008014546 U1 | 4/2009 |

(Continued)

OTHER PUBLICATIONS

International Search Report and Written Opinion of the International Searching Authority for International Patent Application No. PCT/IL2016/050056, dated May 9, 2016 (8 pages).

(Continued)

*Primary Examiner* — Matthew O Savage
(74) *Attorney, Agent, or Firm* — Dorsey & Whitney LLP

(57) ABSTRACT

The present disclosure concerns a filter device for filtering source water for the purpose of obtaining potable water; and further concerns a method for assembly of such a device.

17 Claims, 14 Drawing Sheets

(51) Int. Cl.
*C02F 1/50* (2006.01)
*C02F 1/00* (2006.01)
*B01D 24/18* (2006.01)
*B01D 29/58* (2006.01)
*C02F 9/00* (2006.01)
*C02F 101/20* (2006.01)
*C02F 101/10* (2006.01)

(52) U.S. Cl.
CPC .................................. *C02F 1/42* (2013.01); *C02F 1/50* (2013.01); *C02F 9/005* (2013.01); *C02F 2101/103* (2013.01); *C02F 2101/20* (2013.01); *C02F 2201/006* (2013.01); *C02F 2201/007* (2013.01); *C02F 2307/04* (2013.01)

(58) Field of Classification Search
CPC ............ C02F 2101/20; C02F 2201/006; C02F 2201/007; C02F 2307/04; B01D 23/10; B01D 27/02; B01D 27/148; B01D 24/18; B01D 24/58
See application file for complete search history.

(56) References Cited

U.S. PATENT DOCUMENTS

| | | | |
|---|---|---|---|
| 2,369,915 | A | 2/1945 | Quinn et al. |
| 2,413,375 | A | 12/1946 | Pomeroy et al. |
| 3,246,920 | A | 4/1966 | Pall et al. |
| 3,434,486 | A | 3/1969 | Walter et al. |
| 3,520,124 | A | 7/1970 | Myers |
| 3,937,399 | A | 2/1976 | Halley et al. |
| 4,028,276 | A | 6/1977 | Harden et al. |
| 4,109,676 | A | 8/1978 | Price et al. |
| 4,228,012 | A | 10/1980 | Pall |
| 4,265,748 | A | 5/1981 | Villani et al. |
| 4,681,677 | A | 7/1987 | Kuh et al. |
| 4,702,270 | A | 10/1987 | King et al. |
| 4,772,386 | A | 9/1988 | Grout et al. |
| 4,818,385 | A | 4/1989 | Medley et al. |
| 5,076,912 | A | 12/1991 | Conradt et al. |
| 5,236,578 | A | 8/1993 | Oleskow et al. |
| 5,474,675 | A | 12/1995 | Kupka |
| 5,527,451 | A | 6/1996 | Hembree et al. |
| 5,536,394 | A | 7/1996 | Lund et al. |
| 5,536,398 | A | 7/1996 | Reinke et al. |
| 5,635,064 | A | 6/1997 | Bovington |
| 5,667,303 | A | 9/1997 | Arens et al. |
| 5,679,243 | A | 10/1997 | Cho et al. |
| 5,846,300 | A | 12/1998 | Johnson et al. |
| 5,882,507 | A | 3/1999 | Tanner et al. |
| 5,997,734 | A | 12/1999 | Koski et al. |
| 6,416,664 | B1 | 7/2002 | Bovington et al. |
| 6,428,708 | B1 | 8/2002 | Halemba et al. |
| 6,454,941 | B1 | 9/2002 | Cutler et al. |
| 6,491,811 | B2 | 12/2002 | Conrad et al. |
| 6,926,828 | B2 | 8/2005 | Shiraishi et al. |
| 7,311,829 | B2 | 12/2007 | Wilder et al. |
| 7,441,665 | B2 | 10/2008 | Bridges et al. |
| 2002/0092813 | A1 | 7/2002 | Radford |
| 2004/0094459 | A1 | 5/2004 | Prater et al. |
| 2004/0238422 | A1 | 12/2004 | Launer et al. |
| 2005/0011824 | A1 | 1/2005 | Vetterli et al. |
| 2005/0072729 | A1 | 4/2005 | Bridges et al. |
| 2005/0109083 | A1 | 5/2005 | Werner et al. |
| 2005/0109683 | A1 | 5/2005 | Joyce et al. |
| 2012/0168357 | A1 | 7/2012 | Wilder et al. |
| 2013/0213877 | A1* | 8/2013 | Lin .................. C02F 1/003 210/338 |

FOREIGN PATENT DOCUMENTS

| | | |
|---|---|---|
| EP | 0202201 | 11/1986 |
| EP | 469407 A2 | 2/1992 |
| EP | 1068888 B1 | 7/2005 |
| GB | 2196329 A | 4/1988 |
| JP | 06072689 B | 11/1994 |
| JP | 08318113 A | 12/1996 |
| JP | 10337421 A | 12/1998 |
| JP | 2005296919 A | 10/2005 |
| RU | 2182033 C2 | 5/2002 |
| RU | 2252061 C1 | 5/2005 |
| WO | 9613318 A1 | 5/1996 |
| WO | 9941201 A1 | 8/1999 |
| WO | 0200552 A2 | 1/2002 |
| WO | 03028848 A1 | 4/2003 |
| WO | 2004052789 A2 | 6/2004 |
| WO | 20040071961 | 8/2004 |
| WO | 2005092798 A1 | 10/2005 |
| WO | 2006003353 A1 | 1/2006 |
| WO | 2008026208 A2 | 3/2008 |
| WO | 2008044230 A1 | 4/2008 |
| WO | 2008129551 A1 | 10/2008 |
| WO | 2011030340 | 3/2011 |

OTHER PUBLICATIONS

International Preliminary Report on Patentability for International Patent Application No. PCT/IL2016/050056, dated May 24, 2017 (12 pages).

\* cited by examiner

WATER FILTER AND ASSEMBLY THEREOF

TECHNOLOGICAL FIELD

The present disclosure concerns a filter device for filtering source water for the purpose of obtaining potable water; and further concerns a method for assembly of such a device.

BACKGROUND ART

References considered to be relevant as background to the presently disclosed subject matter are listed below:
 WO 2008/026208
 WO 2008/044230
 WO 2011/030340

Acknowledgement of the above references herein is not to be inferred as meaning that these are in any way relevant to the patentability of the presently disclosed subject matter.

BACKGROUND

Filtering devices and methods for filtering liquids, particularly such for filtering water, are generally known. Such filtering devices hold filtering media with reactants that can remove harmful or otherwise undesired substances from water. Examples are the filtering devices disclosed in the above-referenced 3 publications.

GENERAL DESCRIPTION

The present disclosure provides, by the first of its aspects, a filter, for use in obtaining potable water, made from several building blocks. The building blocks of the filter are designed for streamlined industrial manufacturing production that requires relatively few manufacturing steps. Also provided by this disclosure is a process for assembly of such a filter. The filter of this disclosure is compartmentalized and designed such that the water flow path takes the water through the different internal compartments in succession. Each of the compartments may contain a different water treatment medium, to thereby provide different water treatment functionalities; although some compartments may contain a water treatment medium with a similar functionality or even identical to a medium contained in another compartment. Also, it is possible for one or more compartments to contain more than one filter treatment medium. The water flow path follows a generally curvilinear or serpentine descending flow path of the kind described, for example, in PCT Applications having Publication Nos. WO 2008/026208 and WO 2011/030340.

The term "water treatment medium" is used herein to refer to a medium that may be solid porous blocks, granular, particulate, etc., that interacts with or acts on the water in a manner such that the water egressing a compartment containing the water treatment medium is different in at least one respect from that ingressing this compartment. The difference may be the removal of a component by filtration, absorption or adsorption; adding a component, e.g. an agent with an anti-microbial activity; a change in odor or flavor by addition or removal of a substance; etc.

The water filter of this disclosure is defined between bottom, peripheral and top walls and generally comprises four concentric compartments defined by divider walls. These compartments will be referred to herein in respective peripheral-to-central direction as first, second, third and fourth compartments. The filter is configured to have one or more water inlets at the top wall that lead into the first compartment. A first water passage links the bottom ends of the first and second compartments, a second water passage links the top ends of the second and third compartments, a third water passage links the bottom ends of the third and fourth compartments, and a fourth water passage links the fourth compartment to the filter outlet, which is formed in the center of the bottom wall. As noted above, the overall flow path is a generally descending serpentine path, which means that the second water passage is at a level lower than the water inlet and higher than the fourth water passage.

In the following description elements associated with each of the first, second, third and fourth compartments may be referred to with corresponding first, second, etc. qualifier. Thus, for example, perforated divider element fitted into the second compartment will be referred to as a "second perforated divider element" even though there may not be a first of such elements. Similarly, as will also be noted in the text below, each of these compartments may be sub-compartmentalized, for example, into bottom and top sub-compartments. Thus, by way of example, such sub-compartments of the second compartment will be referred to as "the second bottom sub-compartment" and "the second top sub-compartment" even though there may not be a first sub-compartment.

The filter is formed from building blocks that comprise a base member, a sleeve insert, a tubular insert and a lid element.

The base member comprises the filter's bottom wall which, as aforesaid, has a central filter outlet, and comprises peripheral walls that are integral with and extend upwardly from the bottom wall. The base member comprises also an integral sleeve formed between the peripheral walls and the filter outlet and concentric with the filter outlet. The integral sleeve is defined by a closed-loop wall that, thus, divides the filter's internal space into a central space and a peripheral space.

The sleeve insert has a generally cylindrical shape and is formed by a closed-loop wall and is fitted into the peripheral space to thereby define a concentric divider wall, dividing the internal space into a first compartment and a second compartment.

The tubular insert is provided with a lumen that is defined between an open bottom and a sealed top and is fitted over the filter outlet, thereby dividing the central space into a third compartment and a fourth compartment.

The lid element is sealingly fitted over the base member, to thereby form the filter. The second water passage is typically defined by a clearance above the apex of the integral sleeve, which is referred to herein as "sleeve apex". However, it is also possible that the second water passage will be formed by perforations or recesses at the upper edge of the integral sleeve.

The first and third water passages are typically defined between the bottom wall and respective bottom ends of the sleeve insert and of the tubular insert. By one embodiment, the bottom wall comprises spacer elements that extend upwardly from the bottom wall, and, hence, the bottom ends of the sleeve insert and of the tubular insert rest on said spacer elements to thereby define the respective first and third water passages. The spacer elements may be constituted by ribs formed on and projecting from said bottom wall.

The filter, by some embodiments, may also comprise an integral tube element fitted around the filter outlet and defining a tube lumen upwardly extending from the filter outlet to a tube inlet which is at a level below said sleeve apex. By one embodiment, a porous polisher element is fitted within the fourth compartment, e.g. seated within the lumen of the tubular insert, over the filter outlet. While flowing in the fourth water passage, the water passes through the porous polisher element for final water polishing (i.e. for removal of micron or sub-micron particulate contaminants and/or removal of taste components or odors).

Typically, but not exclusively, at least one of the first, second, third or fourth compartments is divided by one or more horizontal perforated divider elements into vertically-arranged sub-compartments. Thus, water flowing through such sub-compartmentalized compartments, flows consecutively from one such sub-compartment to and through the other, in either an ascending or descending flow path, depending on the specific compartment that is sub-compartmentalized.

By an embodiment of this disclosure, said second or third compartments are so sub-compartmentalized, such sub-compartmentalization being achieved by respective second and third perforated divider elements formed as an annular element fitted into respective second or third compartment.

By an embodiment of this disclosure, the bottom end of at least one first, second, third or fourth, typically the second and/or third compartments, is fitted with a horizontal bottom perforated element. The sleeve insert, by one embodiment, comprises a bottom perforated element that is integrally formed therewith and serving the function (in the filter) of the second horizontal bottom perforated element. Similarly, the tubular insert may also comprise, by an embodiment of this disclosure, an integrally formed bottom perforated element and serving the function (in the filter) of the third horizontal bottom perforated element.

By some embodiments, the top end of one or more of the first, second and/or third compartments, typically the second and/or the third, is fitted with a horizontal top perforated element. By one embodiment, a second top perforated element and a third top perforated element are integrally formed with one another and are generally constituted by a disk-shaped element that is fitted over the second and third compartments.

A specific embodiment of this disclosure is one including a first, non-sub compartmentalized compartment, second and third compartments that are sub-compartmentalized into respective second and third bottom and second and third top sub-compartments and a fourth compartment with a porous solid polisher element. The contents of the different compartments and sub-compartments are typically as follows:
the first compartment comprises a first absorbent;
the second bottom sub-compartment comprises a first ion exchanger;
the second top sub-compartment comprises a second ion exchanger, which may be the same or different than the first ion exchanger;
the third top sub-compartment comprises an antimicrobial composition;
the third bottom sub-compartment comprises a second absorbent, which may be the same of different that the first absorbent; and
the fourth compartment comprises a polisher composition.

Thus, the water passage in the case of said specific embodiment leads the water, in succession, through (i) the first absorbent, (ii) the first ion exchanger, (iii) the second ion exchanger, (iv) the antimicrobial composition, (v) the second absorbent, and (vi) the polisher.

By another embodiment, the sub-compartments may contain other water treatment median, for example:
the first compartment comprises an absorbent,
the second bottom sub-compartment comprises a first ion exchanger,
the second top sub-compartment comprises a second ion exchanger,
the third top sub-compartment comprises a third ion exchanger,
the third bottom sub-compartment comprises an antimicrobial composition, and
the fourth compartment comprises a polisher composition.

Provided by another aspect of this disclosure is a process for assembly of a compartmentalized water filter of the kind described above. The process comprises (a) providing a base member of the kind described above; (b) inserting the sleeve insert into the peripheral space to define a divider wall dividing the peripheral space into the first and second compartments; (c) inserting the tubular insert into the central space to divide it into the third and fourth compartments; (d) introducing water treatment media into one or more of the first, second or third compartments; and (e) sealingly fitting a lid element over the base member.

The sequence of steps in the above process may be as described or different. For example, step (c) may be carried out prior, simultaneously or after step (b). Also step (d) may be carried out after steps (b) and (c); or may, for example, be intertwined with steps (b) and (c), e.g. after inserting the sleeve insert, adding water treatment media into first and second compartments and then only inserting the tubular insert into the central space.

By an embodiment, the process may also comprise introducing the porous polisher element over the filter outlet and then fitting the lumen of the tubular insert over the polisher element. Alternatively, the polisher element may be first fitted into the tubular insert and then the two may be fitted together over the filter outlet.

Step (d) by some embodiments, may comprise the following sub-steps in the given or any other order: (d1) introducing a first water treatment medium into said first compartment; (d2) (i) introducing a second water treatment medium into the bottom of the second compartment, (ii) introducing a second horizontal perforated annular divider element into the second compartment to thereby divide the second compartment into a second bottom sub-compartment containing said second water treatment medium and a second top sub-compartment, and (iii) introducing a third water treatment medium into the second top sub-compartment; and (d3) (i) introducing a fourth water treatment medium into the bottom of the third compartment, (ii) introducing a third horizontal perforated annular divider element into the third compartment to thereby divide the third compartment into a third bottom sub-compartment containing said fourth water treatment medium and a third top sub-compartment, and (iii) introducing a fifth water treatment medium into the third top sub-compartment.

The process may also comprise, between steps (d) and (e), the following step (e') of introducing a circular perforated element and seating it on top of the sleeve apex to thereby define a horizontal top perforated element of the second and of the third compartments.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The invention will now be illustrated with reference to an exemplary embodiment illustrated schematically in the annexed Figures.

Figure 1:
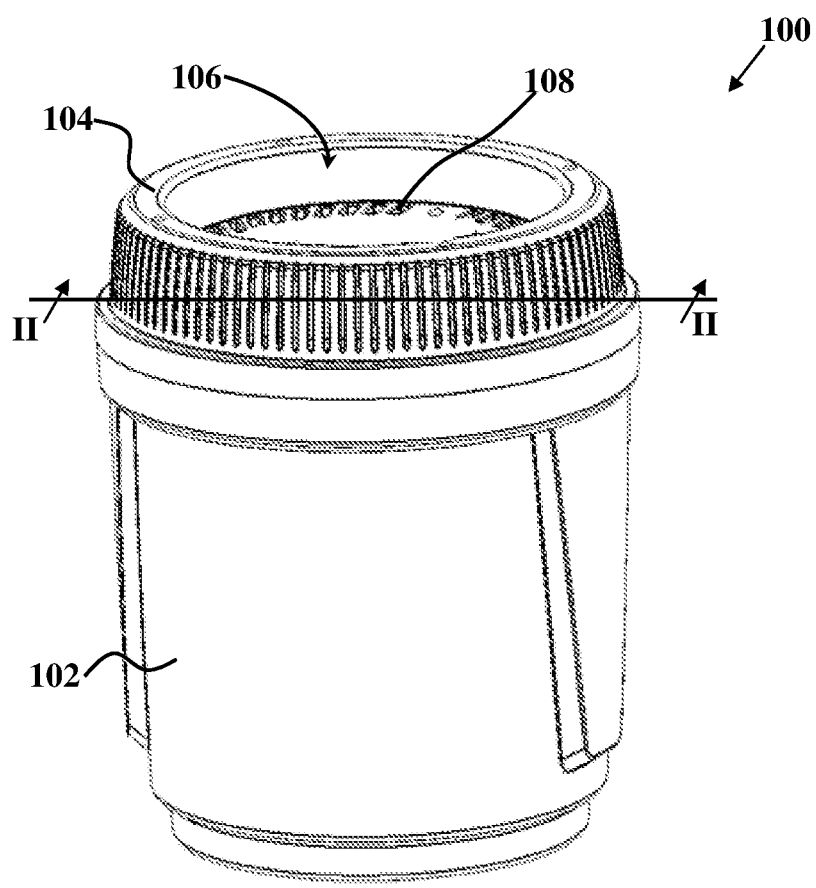
FIG. 1 is a 3-dimensional representation of a filter according to an embodiment of this disclosure.

Reference is first being made to FIG. 1 showing a filter 100 with an external casing defined by base member 102 and lid element 104 sealingly fitted over the base member. Formed within recess 106 at the top of lid element 104 are a plurality of filter inlets 108 which, as will be explained below, lead into a first, most peripheral compartment of the filter.

Figure 2:
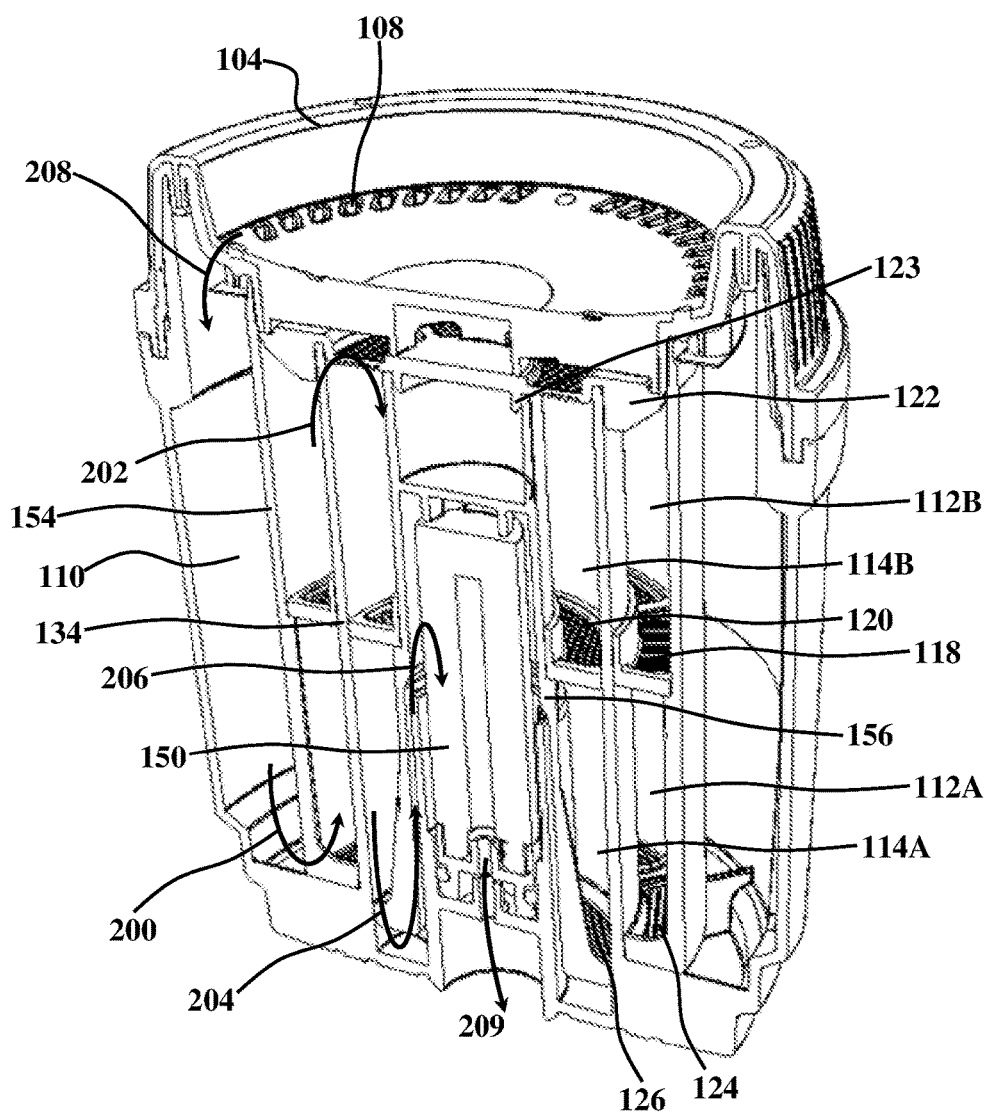
FIG. 2 is a perspective longitudinal cross-section through the filter along axis II-II.

FIG. 2 shows the filter's internal structure. Vertical divider walls, their configuration to be explained below, divide the internal space into four concentric compartments consisting of a first compartment 110, second compartment 112, third compartment 114 and a fourth compartment 116 (better seen in FIG. 5C). The second and third compartments 112, 114 are divided by respective second and third horizontal perforated elements 118, 120 into respective second bottom and top sub-compartments 112A, 112B, and third bottom and top sub-compartments 114A, 114B. Fitted on top of the second and third compartments is a perforated disk-shaped element 122 which can more clearly be seen in FIG. 3, and which defines a second top perforated annular element 122A fitted over a second compartment and a third top perforated annular element 122B fitted on top of the third compartment; the second and third top perforated annular elements 122A and 122B are integral with one another.

In addition, as can also be seen, the filter comprises second and third bottom perforated elements 124, 126 at the bottom of the second and third compartments, respectively. All these perforated elements have the prime purpose of confining water treatment media into defined compartments.

Figure 3:
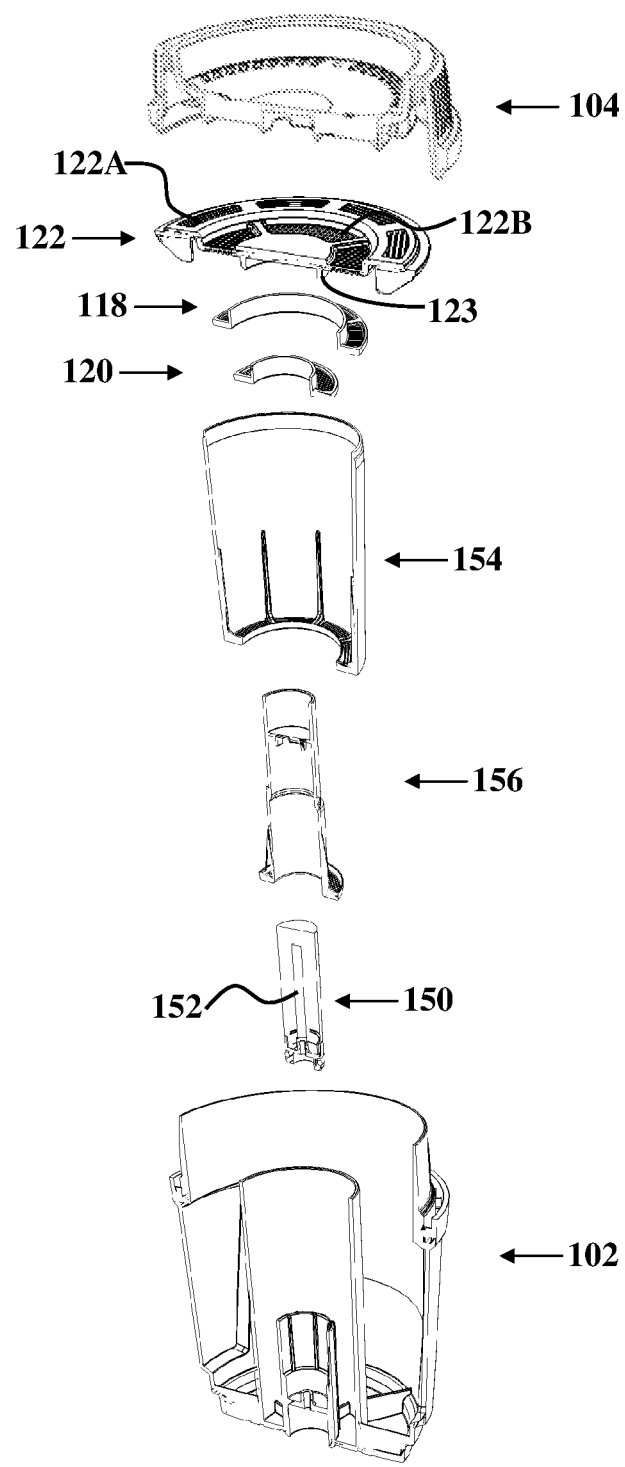
FIG. 3 is an exploded perspective cross-sectional view of the filter.
Figure 4A:
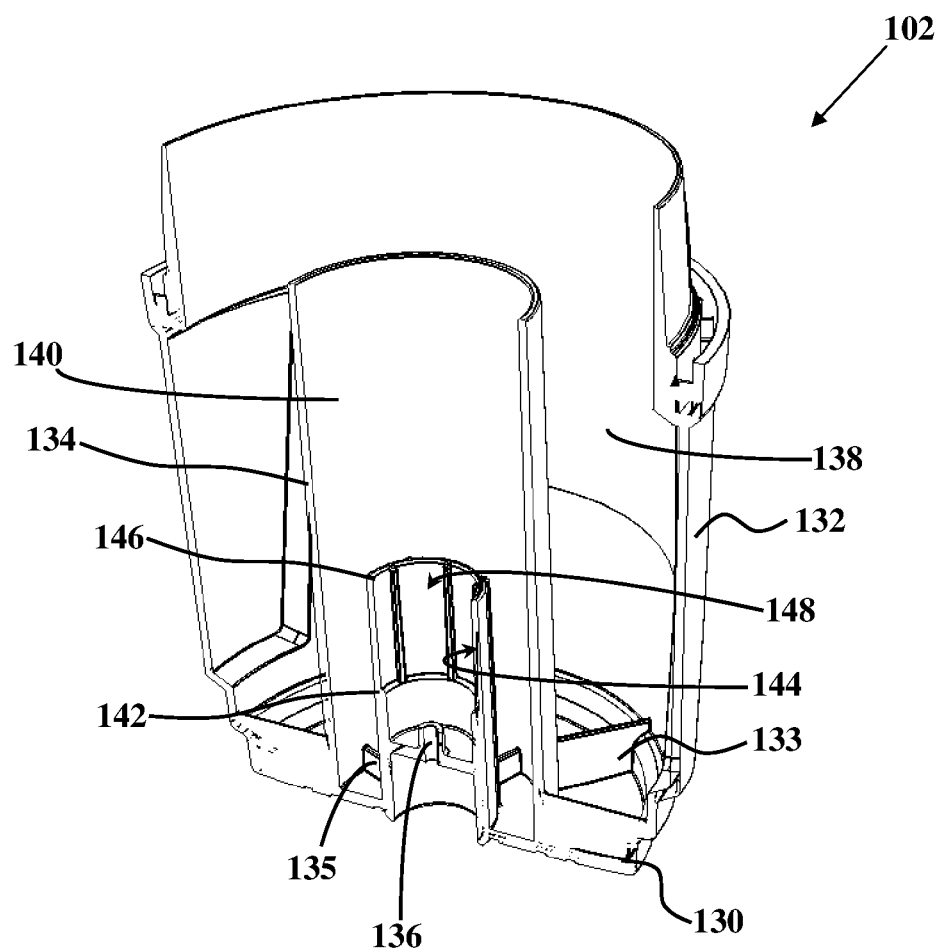
FIGS. 4A, 4B, 4C and 4D are enlarged perspective cross-sectional views of the base member, sleeve insert, tubular insert and lid element, respectively.
Figure 4B:
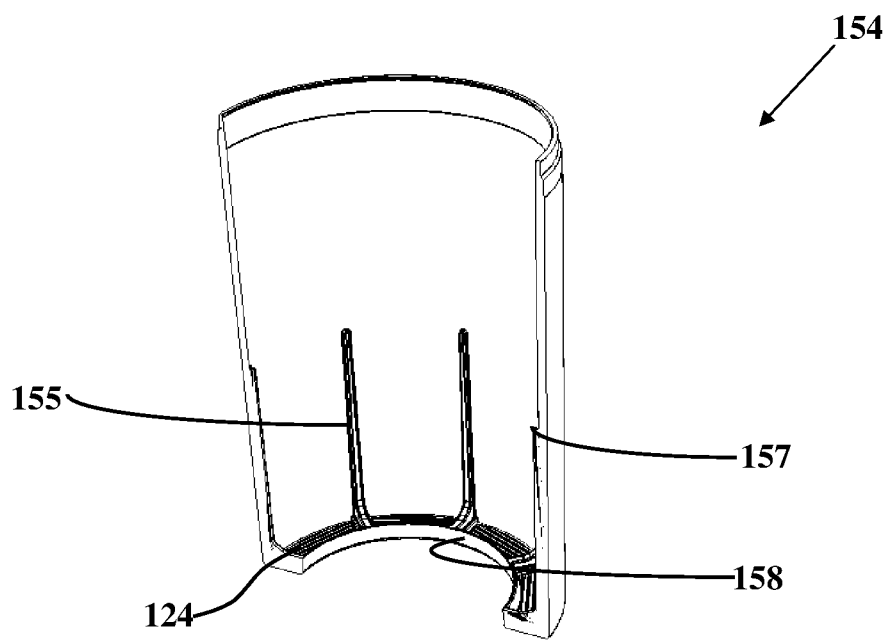
Figure 4C:
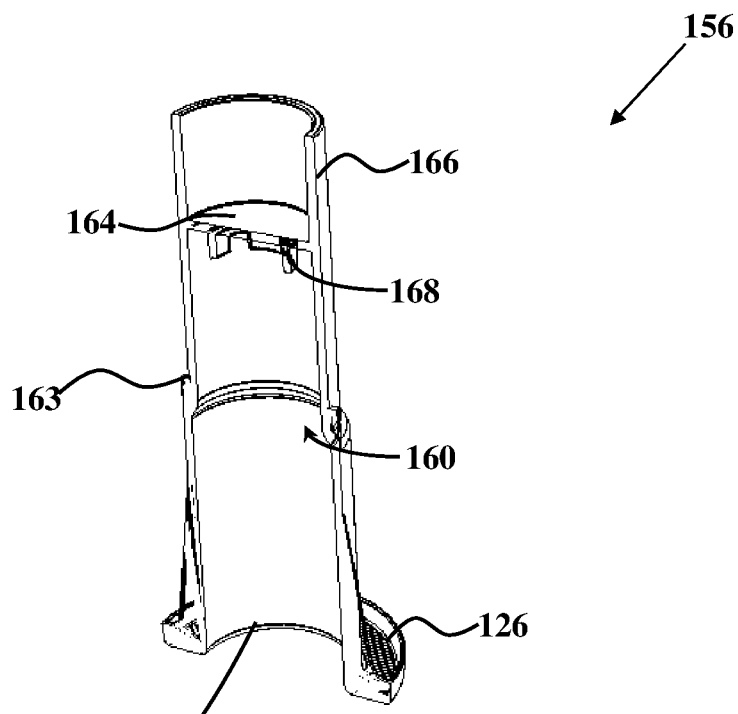
Figure 4D:
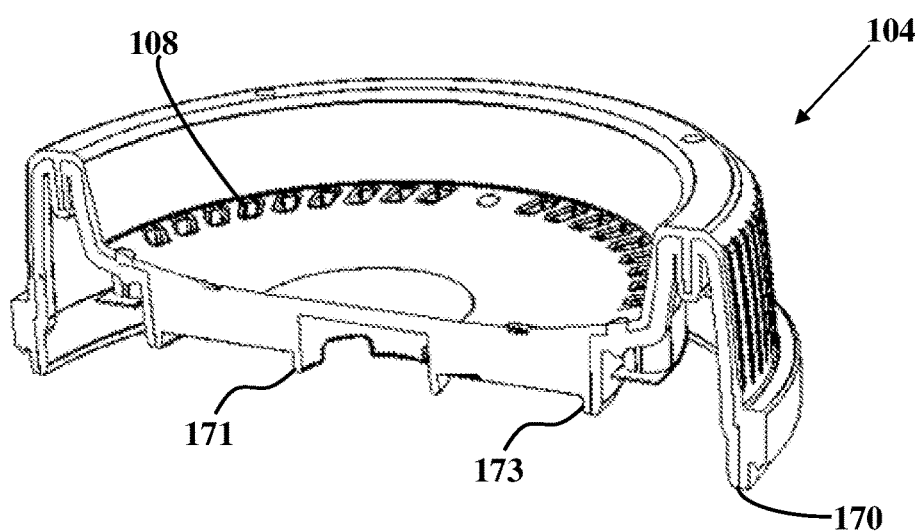

FIGS. 3-4D illustrate the building blocks of the filter (other than the water treatment media to be described further below). As can be seen, the filter is structured from a number of basic building blocks that are seen in enlarged views in FIGS. 4A-4D and some additional auxiliary elements.

First, as can be seen in FIGS. 3 and 4A, the base member 102 includes a bottom wall 130, peripheral walls 132, an integral sleeve 134 concentric with a central filter outlet 136 formed in the bottom wall. The integral sleeve 134 divides the internal filter space into a peripheral space 138 and a central space 140 (each of which is further compartmentalized in the assembled filter, as will be described further below). Formed around filter outlet 136 is an integral tube element 142 having a lumen extending from the outlet up to the tube's apex 146 which defines a tube inlet 148. It should be noted that in some embodiments, such integral tube may not be included. The walls of the integral tube 142 are configured to provide a seat for the polisher element 150, as seen in FIG. 2. As will also be understood from the explanation below, the filter is configured to have a first water passage 200 linking the bottom ends of the first and second compartments 110, 112; a second water passage 202 linking the top ends of the second and third compartments 112, 114; a third water passage 204 linking the bottom ends of the third and fourth compartments 114, 116; and a fourth water passage 206 linking the fourth compartment 116, through polisher element 150 and the lumen 152 formed within polisher element 150 to the filter outlet 136. This creates a generally curvilinear (or serpentine) descending flow path beginning from the filter inlet 108, represented by arrow 208, and leading to the filter outlet 136, as represented by arrow 209.

Other building blocks of the filter include a cylindrical insert 154, a tubular insert 156 and lid element 104. Auxiliary elements that may be absent from some embodiments include the second and third annular perforated divider elements 118, 120 and the generally disk-shaped element 122. Also included in this specific embodiment, as already pointed out above, are second and third bottom perforated elements 124, 126 integrally formed with inserts 154 and 156, respectively, which may be absent in some embodiments.

Sleeve insert 154 is inserted within the peripheral space 138 and is concentric with the integral sleeve 134. The proper positioning of the sleeve insert is guided by the internal rim 158 of the second bottom perforated element 124. Sleeve insert 154, thus, defines a divider wall that divides the peripheral space into the first and second concentric compartments 110, 112, as seen in FIG. 2.

Formed at the bottom wall of base member 102 are ribs 133 outwardly projecting from bottom wall 130. The bottom end of sleeve insert 154 rests on these ribs and the space below thus defines the first water passage 200.

Tubular insert 156 has a lumen 160 that is defined between a bottom opening 162 and a sealed top end defined by integral end wall 164. The tubular insert 156 has a tubular projection 166 extending upwardly from integral end wall 164, which serves as a support for disk-shaped element 122 and configured to accommodate the downward projecting annular element 123 to thereby assist in positioning of element 122. Also, lid element has two integral downwardly projecting annular elements, these being a respective central one 171 and a respective peripheral one 173 that bear on disk-shaped element 122; and consequently, through the intermediary of disk-shaped element 122, the tubular projection 166 ensures that tubular insert 156 is maintained tightly in its position after securing the lid element 104 on top of the base member 102.

The lumen 160 is sized and configured for accommodating polisher element 150 and maintain sufficient clearance for the fourth water passage 206.

In addition to ribs 133, formed on bottom wall 130 of base member 102, are also ribs 135 which upwardly project from the bottom wall into the central space 140. The bottom portion of tubular insert 156 is sized and configured to fit snugly against the internal face of integral sleeve 134 and this snug association ensures proper positioning such that it is also concentric with the filter outlet. Once fully inserted, tubular insert 156 fits on top of ribs 135 and the clearance between the bottom end of insert 156 and the bottom wall defines the third water passage 204, while the clearance between the internal faces of lumen 160 and the integral tube 142 define the fourth water passage 206.

The fourth building block is lid element 104, with openings 108 that leads into the first compartment 110 and constitute the filter inlet. The lid element 104 is configured for engagement with the disk-shaped element 122 and the sleeve insert 154 so as to hold all the inserts tightly in position. Lid element 104 may also include, by some embodiments, an indicator element of the kind disclosed, for example, in PCT Application having the publication number WO 2008/044230.

Elements 118, 120 and 122 are auxiliary elements and may be absent from some embodiments of this disclosure. While in embodiments in which these auxiliary elements are absent the different compartments may not be fully physically separated, a filter without these elements may nonetheless function effectively for water treatment to finally obtain potable water, which is the function of the filter of this disclosure.

A sequence of steps for assembly of such filter is illustrated in FIGS. 5A-5H. It should be noted that this is an exemplary sequence and other sequences may also be applicable, as generally described above.

In a first of such steps, polisher 150 is seated within the lumen 144 of integral tube 142, such that the polisher lumen 152 fits over the filter outlet 136. Then, tubular insert 156 is inserted within the internal central space 140 such that the tubular insert lumen 160 envelops element 150; annular ring 168, integral with and downwardly projecting from end wall 164, hold element 150 in position.

Figure 5A:
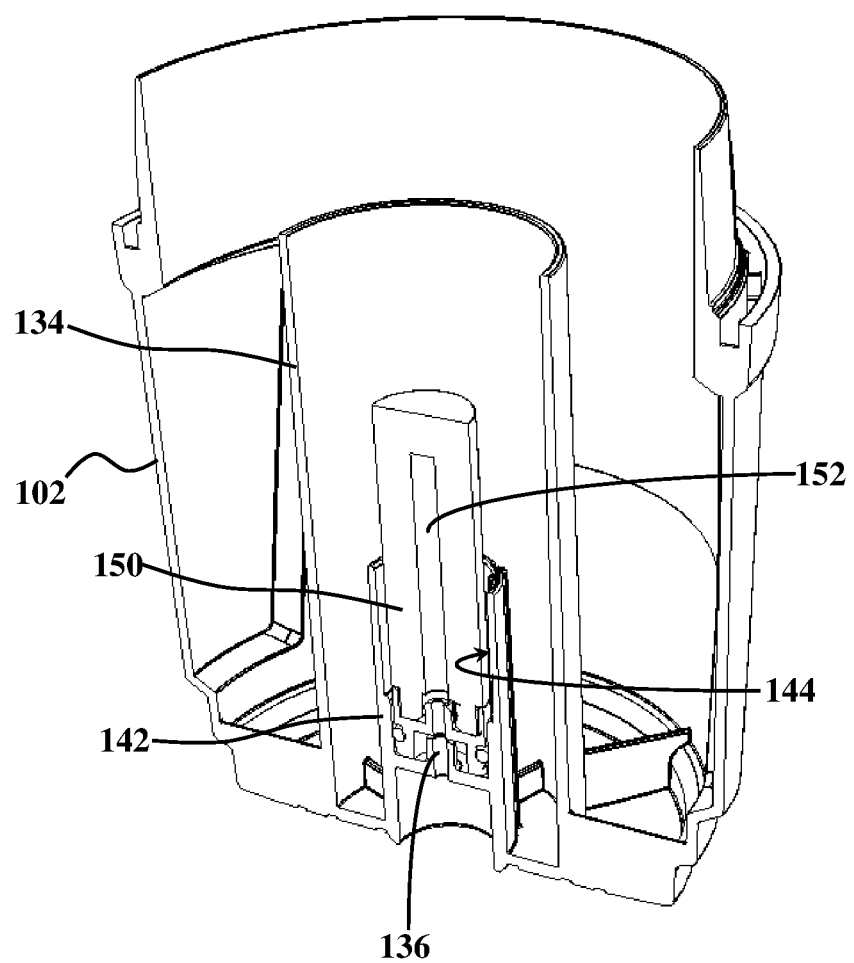
FIGS. 5A-5H are assembly steps of the filter of the illustrated embodiment.
Figure 5B:
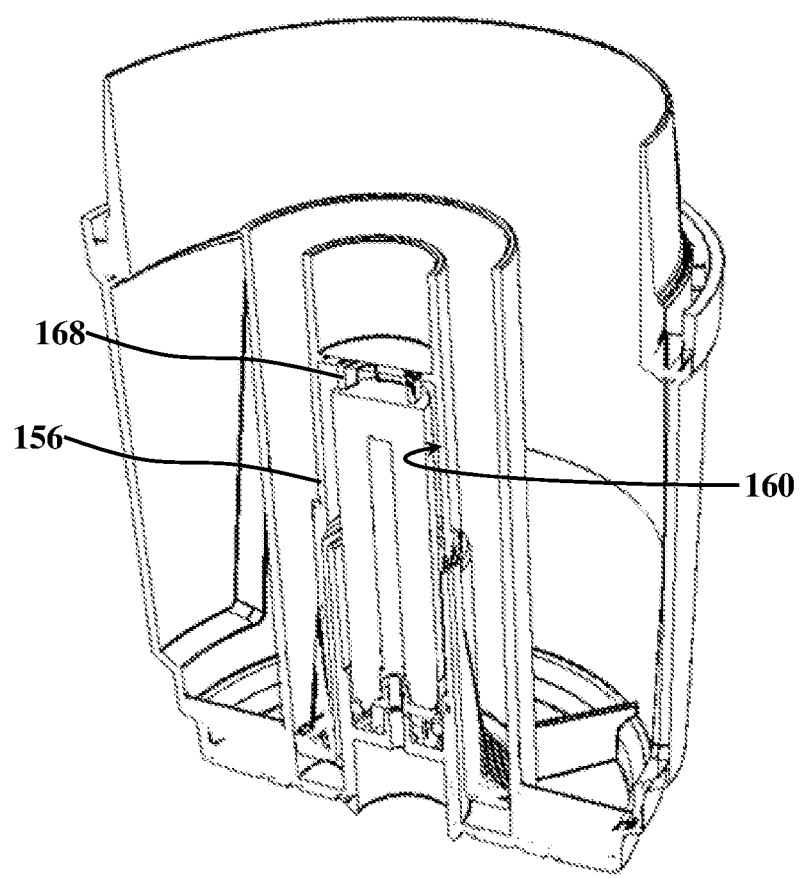
Figure 5C:
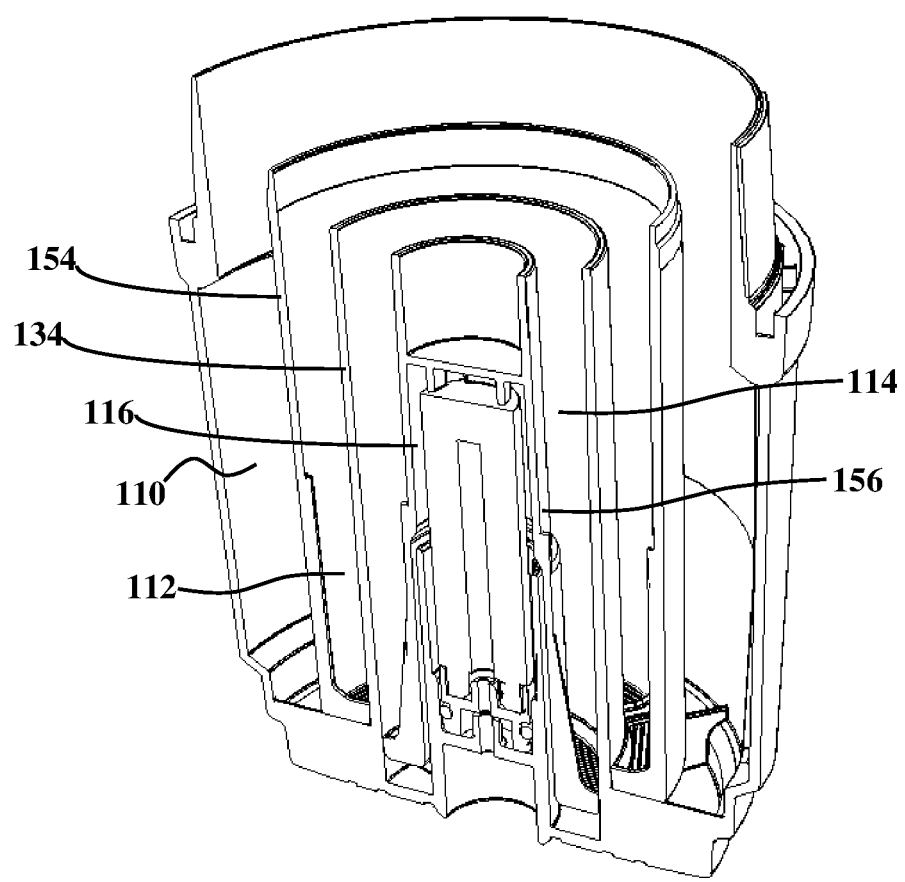

At the next step, seen in FIG. 5C, sleeve insert 154 is fitted within the peripheral space, thus forming first, second, third and fourth compartments 110, 112, 114, 116, respectively.

Steps described below illustrate, among others, the addition of water treatment media. These are qualified as first, second, third, fourth and fifth in correspondence to the sequence of media encountered by the water in its flow path through the filter (encountering the first medium, then the second medium, etc.).

Figure 5D:
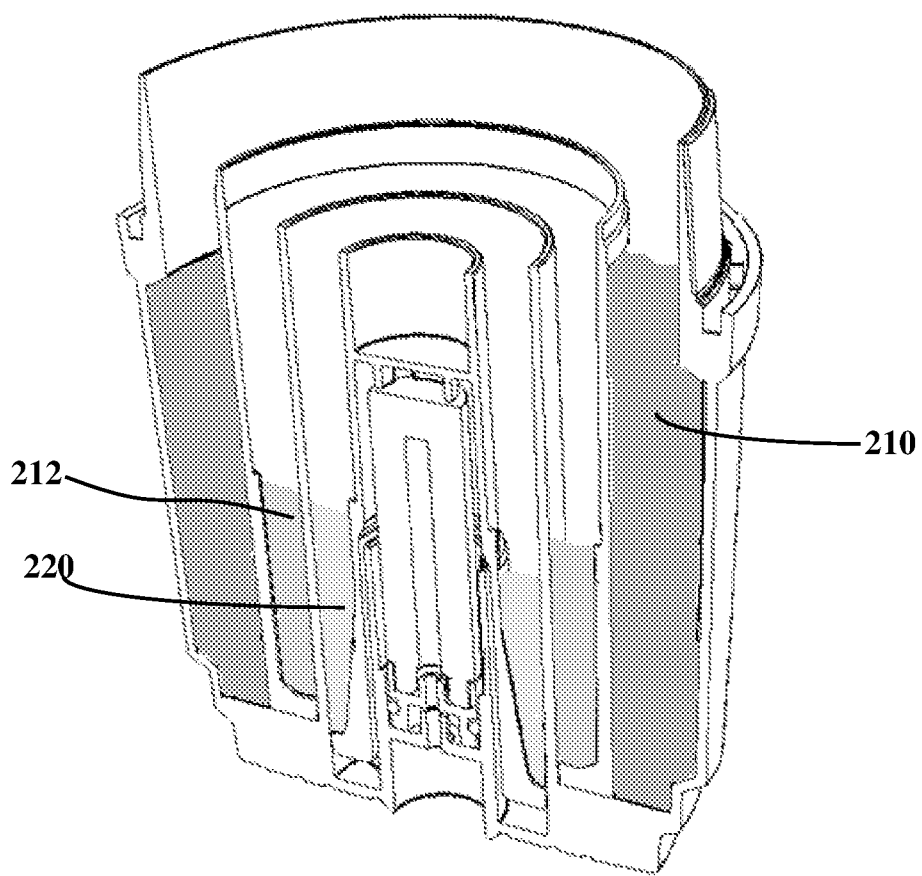

At the next step, seen in FIG. 5D, which is comprised of sub-steps, a first water treatment medium 210, which may, for example, be an absorbent such as activated carbon, is added into the first compartment 110; a second water treatment medium 212 is added into the bottom of the second compartment 112 (such as an ion exchange resin for selective removal of heavy metals); and a fifth water treatment medium, such as an antimicrobial brominated polymer is added to the bottom of a third compartment 114.

Figure 5E:
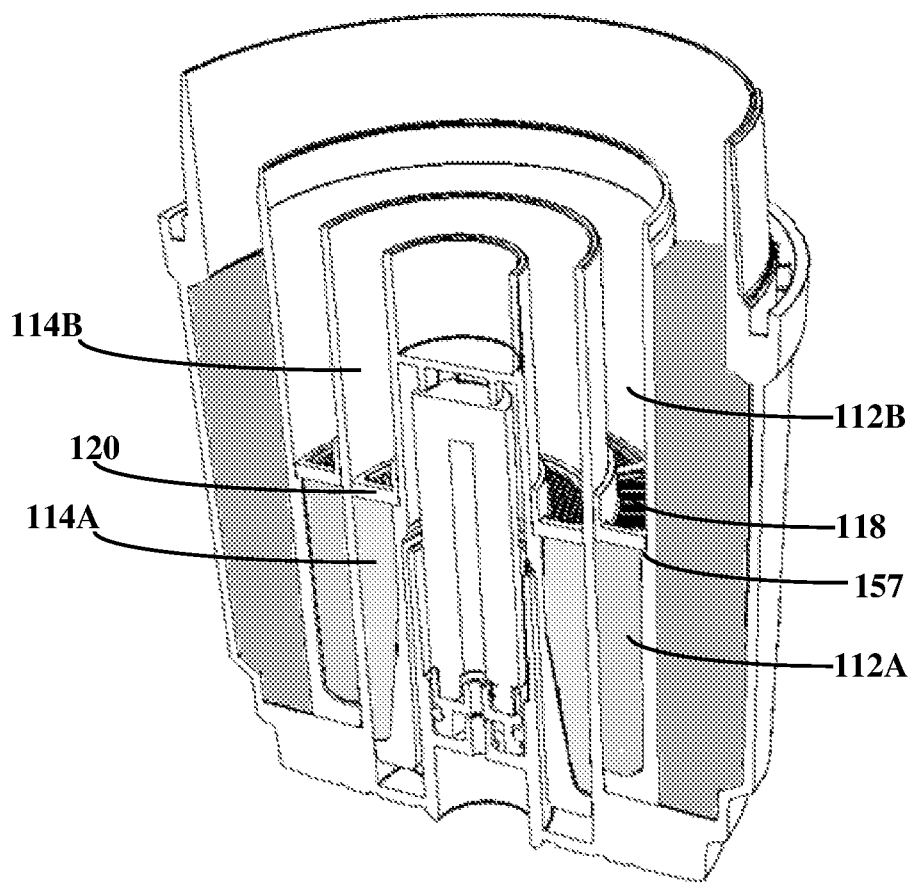

Then, as seen in FIG. 5E, second and third perforated horizontal divider annular elements 118, 120 are inserted into the second and third compartments, respectively. As can be seen, the sleeve insert is formed with internal vertical ribs 155 with top ends 157 that serve as a seat for element 118. Similarly, tubular insert 156 is formed with an external step 163 serving as a support seat for element 120.

Figure 5F:
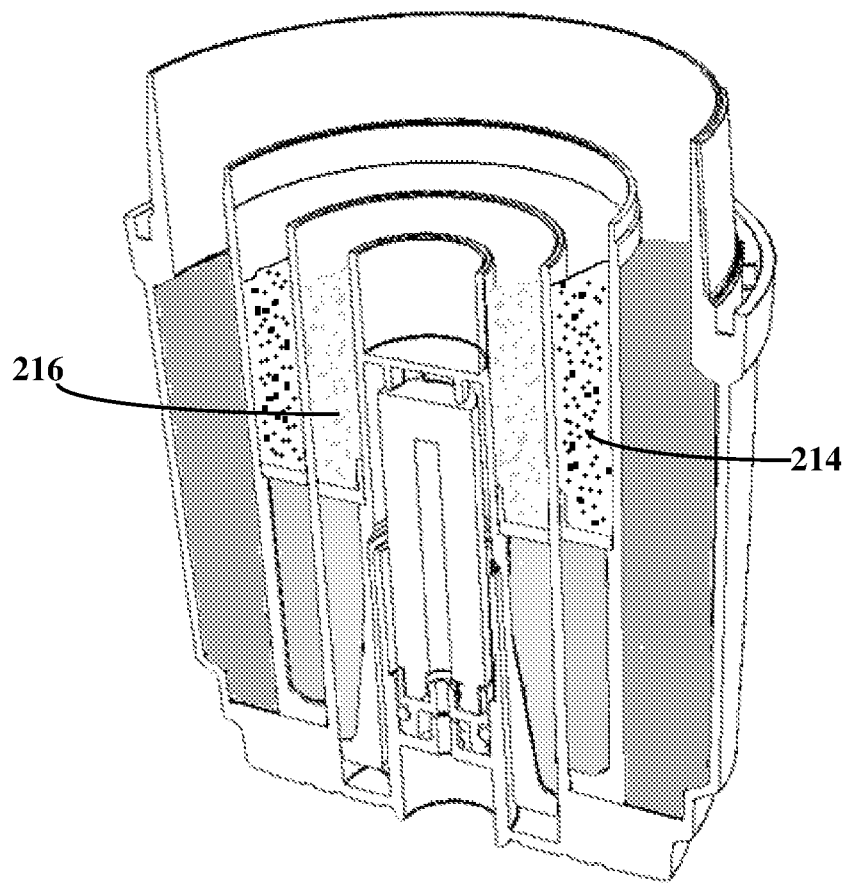

At the next step, which is in fact also comprised of sub-steps, seen in FIG. 5F, third water treatment medium 214 is added into the second top sub-compartments 112B, which may be a second ion exchanger material such as ASM-10-HP for arsenic removal and a fourth water treatment medium 216 is added into the third top sub-compartment 114B, which, for example, may be an ion exchange resin for scale reduction, such as C107E.

Figure 5G:
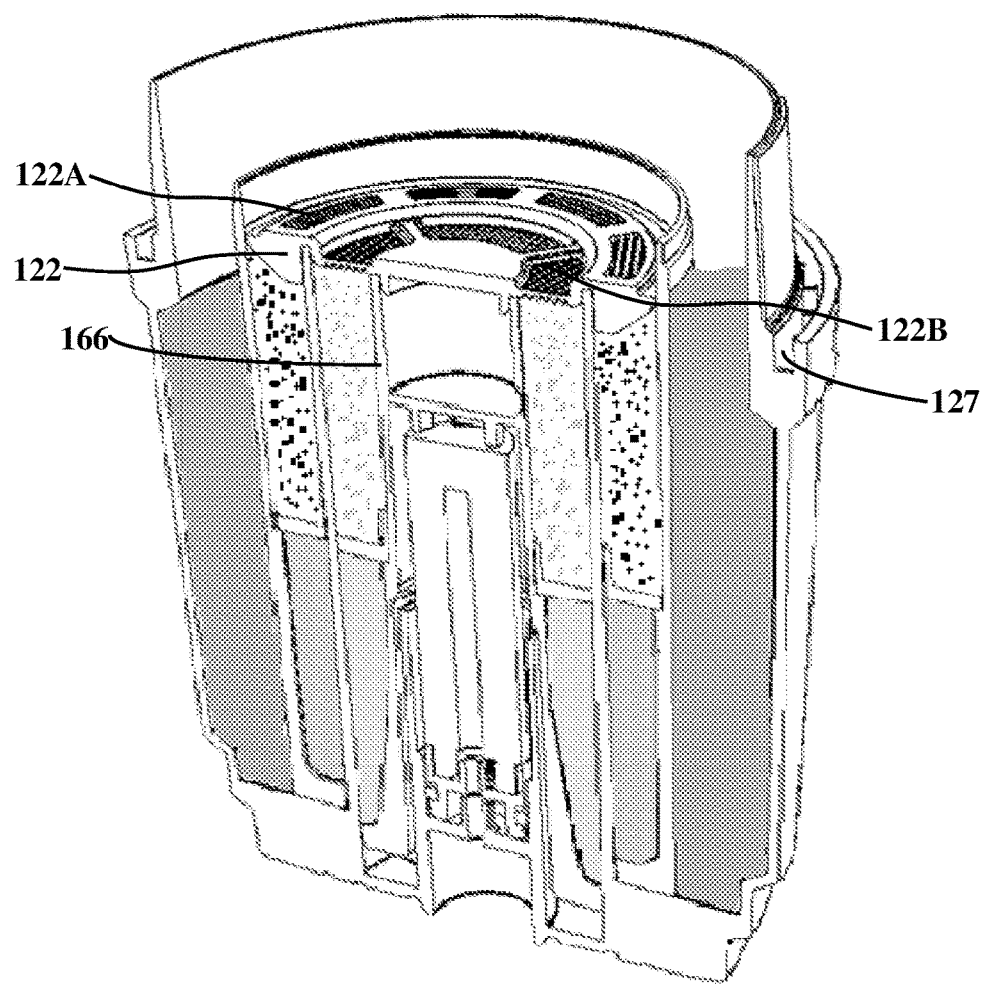

In the next step, shown in FIG. 5G, the disk-shaped element 122 is fitted over the second and third compartments and over the tubular extension 166 of insert 156.

Figure 5H:
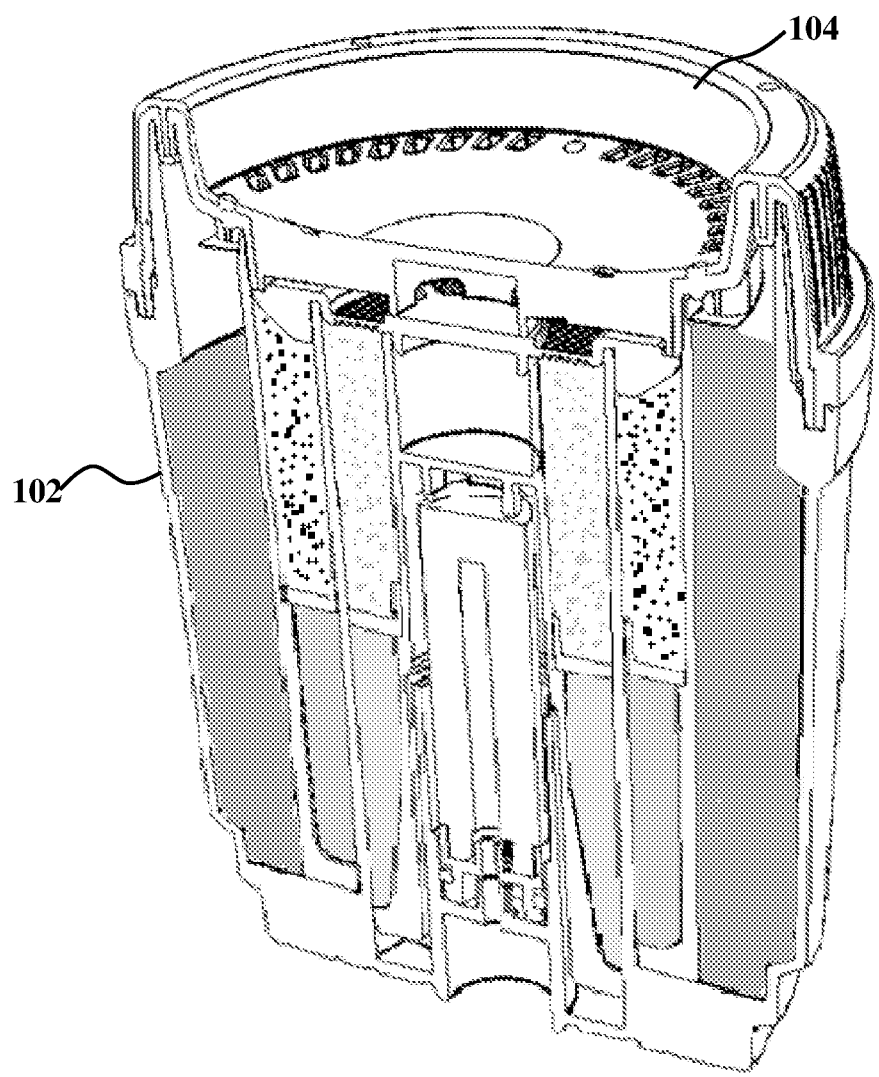

Finally, as seen in FIG. 5H, the lid element is fitted on top of base member 102 with its downward annular projection 170 fitting into a matching trough 172 in the base member, and through an integration process which may, for example, be ultrasonic welding, becomes sealingly engaged to the base member in a water-tight manner.

The invention claimed is:

1. A water filter defined between a bottom wall, a peripheral wall and a top wall and comprising four concentric compartments including, in respective peripheral to central direction a first, second, third and fourth compartment, defined by divider walls, the filter being configured to have one or more water inlets at the top wall leading into the first compartment, a first water passage linking between bottoms of the first and second compartments, a second water passage linking tops of the second and the third compartment, a third water passage linking bottoms of the third and fourth compartments and a fourth water passage between the fourth compartment and a filter outlet formed at the center of said bottom wall; wherein
    the filter is formed from building blocks that are assembled together to form said water filter and comprise:
    a base member comprising (i) the bottom wall with the central filter outlet, (ii) the peripheral wall being integral therewith and extending upwardly therefrom, (iii) an integral sleeve formed around said filter outlet and defined by a closed-loop wall and dividing the filter's internal space into a central space and a peripheral space, and comprising (iv) spacer elements formed on the bottom wall and extending upwardly therefrom into the internal space;
    a sleeve insert formed by closed-loop wall having an integral second bottom perforated element fitted into the peripheral space to divide the peripheral space into the first and second compartments, with said second bottom perforated element defining the bottom end of said second compartment and resting on said spacer elements to define said first water passage;
    a tubular insert with an integral third bottom perforated element and having a lumen defined between an open bottom and a sealed top and fitted over the filter outlet, to divide the central space into the third and fourth compartments, with said third bottom perforated element defining the bottom end of said third compartment and resting on said spacer elements to define said third water passage; and
    a lid element sealingly fitted over the base member.

2. The filter of claim 1, wherein the integral sleeve has a sleeve apex and said second water passage is defined above the sleeve apex.

3. The filter of claim 1, wherein the spacer elements are constituted by ribs formed on and projecting from said bottom wall.

4. The filter of claim 1, comprising an integral tube element fitted around the filter outlet and defining a tube lumen upwardly extending from the filter outlet to a tube inlet, which is at a level below said sleeve apex.

5. The filter of claim 1, comprising a porous polisher element fitted within the fourth compartment over the filter outlet.

6. The filter of claim 1, wherein at least one of the second, and third compartments is divided by one or more horizontal perforated divider elements into vertically arranged sub-compartments.

7. The filter of claim 6, comprising a second perforated divider element formed as an annular element fitted into the second compartment.

8. The filter of claim 6, comprising a third perforated divider element formed as an annular element fitted into the third compartment.

9. The filter of claim 1, wherein the top end of at least one of the second and third compartments is fitted with a horizontal top perforated element.

10. The filter of claim 9, comprising a second top perforated element and a third top perforated element that are integrally formed with one another and constituted by a generally disk-shaped element fitted over the second and third compartments.

11. The filter of claim 1, wherein the second and third compartments are vertically divided into respective second bottom and second top sub-compartments and third bottom and third top sub-compartments, and wherein
the first compartment comprises a first absorbent,
the second bottom sub-compartment comprises a first ion exchanger,
the second top sub-compartment comprises a second ion exchanger,
the third top sub-compartment comprises an antimicrobial composition,
the third bottom sub-compartment comprises a second absorbent, and
the fourth compartment comprises a polisher composition.

12. The filter of claim 1, wherein the second and third compartments are vertically divided into respective second bottom and second top sub-compartments and third bottom and third top sub-compartments, and wherein
the first compartment comprises an absorbent,
the second bottom sub-compartment comprises a first ion exchanger,
the second top sub-compartment comprises a second ion exchanger,
the third top sub-compartment comprises a third ion exchanger,
the third bottom sub-compartment comprises an antimicrobial composition, and
the fourth compartment comprises a polisher composition.

13. A process for assembly of a compartmentalized water filter defined between a bottom wall, a peripheral wall and a top wall and comprising four concentric compartments including, in respective peripheral to central direction a first, second, third and fourth compartment, defined by divider walls and configured to have one or more water inlets at the top wall leading into the first compartment, a first water passage linking between bottoms of the first and second compartments, a second water passage linking tops of the second and the third compartment, a third water passage linking bottoms of the third and fourth compartments and a fourth water passage between the fourth compartment and a filter outlet formed at the center of said bottom wall; the process comprising:
(a) providing a base member that comprises (i) the bottom wall with the central filter outlet, (ii) the peripheral wall integral therewith and extending upwardly therefrom, (iii) an integral sleeve formed around said filter outlet and defined by a closed-loop wall and dividing the filter's internal space into a central space and a peripheral space, and comprises (iv) spacer elements formed on the bottom wall and extending upwardly therefrom into the internal space;
(b) inserting a generally cylindrical sleeve insert formed by closed-loop wall and having an integral second bottom perforated element into the peripheral space to cause the second bottom perforated element to rest on said spacer elements to thereby divide the peripheral space into the first and second compartments, with said second bottom perforated element defining the bottom end of said second compartment and said first water passage;
(c) inserting a tubular insert with an integral third bottom perforated element and having a lumen defined between an open bottom and a sealed top into the central space and over the filter outlet to cause the third bottom perforated element to rest on said spacer elements to thereby divide the central space into the third and fourth compartments, with said third bottom perforated element defining the bottom end of said third compartment and said third water passage; and
(d) introducing water treatment media into one or more of the first, second or third compartments; and
(e) sealingly fitting a lid element over the base member.

14. The process of claim 13, wherein (c) precedes (b).

15. The process of claim 13, comprising introducing a porous polisher element over the filter outlet and fitting the lumen of the tubular insert over the polisher element.

16. The process of claim 13, introducing second and third annular perforated horizontal divider elements into the second and third compartments, respectively, to thereby divide each of the second and third compartment into, respective second bottom and second top sub-compartments and third bottom and third top sub-compartments.

17. The process of claim 13, wherein (d) comprises, in any order
(d1) introducing a first water treatment medium into said first compartment;
(d2) (i) introducing a second water treatment medium into the bottom of the second compartment, (ii) introducing a second horizontal perforated annular divider element into the second compartment to thereby divide the second compartment into a second bottom sub-compartment containing said second water treatment medium and a second top sub-compartment, and (iii) introducing a third water treatment medium into the second top sub-compartment; and
(d3) (i) introducing a fourth water treatment medium into the bottom of the third compartment, (ii) introducing a third horizontal perforated annular divider element into the third compartment to thereby divide the third compartment into a third bottom sub-compartment containing said fourth water treatment medium and a third top sub-compartment, and (iii) introducing a fifth water treatment medium into the third top sub-compartment.

* * * * *